United States Patent Office 2,813,884
Patented Nov. 19, 1957

2,813,884
4-PREGNENES AND METHOD OF PREPARING THE SAME

Seymour Bernstein, Pearl River, N. Y., and Ruddy Littell, Rivervale, N. J., assignors to American Cyanamid Company, New York, N. Y., a corporation of Maine No Drawing. Application May 15, 1956, Serial No. 584,877

17 Claims. (Cl. 260—397.45)

This invention relates to new pregnenes. More specifically, this invention relates to 2α-methyl-4-pregnenes and method of preparing the same.

The novel 2α-methyl-4-pregnenes of the present invention may be represented by the structural formula

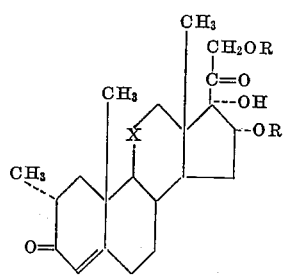

in which R is a member of the group consisting of hydrogen and lower alkanoyl radicals and X is a divalent radical of the group consisting of

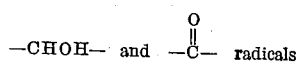

The compounds of the present invention possess glucocorticoid activity similar to hydrocortisone and are useful as anti-inflammatory agents in arthritic, dermatological, and ophthalmic disorders, and, moreover, are useful in the treatment of disorders such as asthma, burns, bursitis, and the like.

The compounds of this invention may be administered to patients suffering from such disorders as the above orally, in tablets, capsules, etc., parenterally, in suspension or solution, or topically, in ointments, creams, or the like.

The compounds of this invention wherein X is the divalent radical —CHOH— may be prepared by reacting a 21-lower alkanoyloxy-20-ethylenedioxy-16α,17α-dihydroxy-4-pregnene-3-one with diethyl oxalate in the presence of an alkali metal alkoxide such as sodium methylate in a solvent such as tertiary butanol or methanol to form the alkali metal enolate of the corresponding 2-ethoxyoxalyl-4-pregnene, treating said alkali metal enolate of said 2-ethoxyoxalyl-4-pregnene with a methyl halide, such as methyl iodide, under alkaline conditions in a solvent, such as acetone, to form the corresponding 2α-methyl-2-ethoxyoxalyl-4-pregnene, removing the ethoxyoxalyl radical by alkaline hydrolysis of the latter intermediate to give the corresponding 2α-methyl-4-pregnene, and finally removing the 20-ethylenedioxy radical by acid hydrolysis.

The 11β-hydroxy compounds prepared immediately above may then be converted to the corresponding 11-oxo compounds by acylating the 16α- and 21-hydroxy groups and then oxidizing with chromium trioxide. By this procedure, 16α,17α,21 - trihydroxy-2α-methyl-4-pregnene-3,11,20-trione in the form of its 16,21-diacetate was prepared.

The series of reactions to prepare the compounds of the present invention can be illustrated by the following

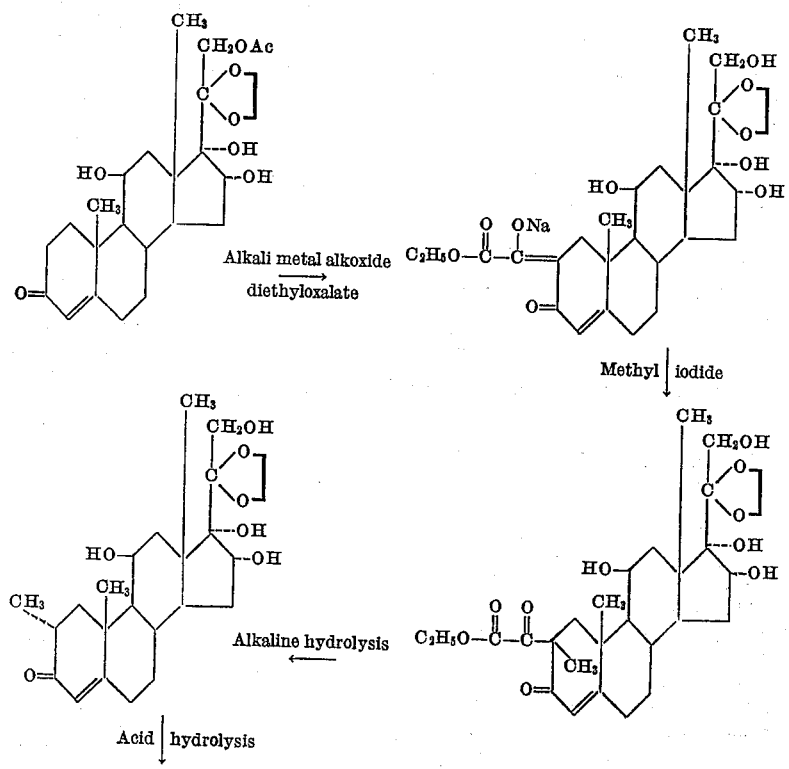

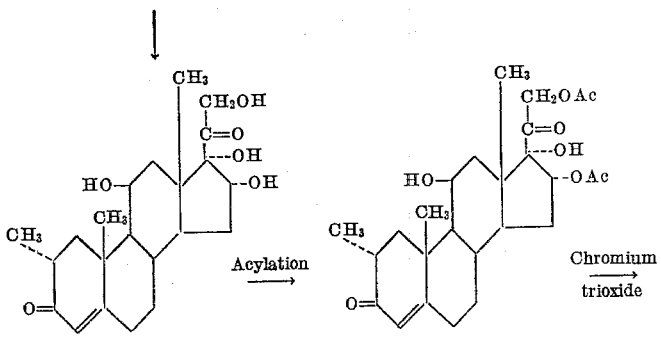 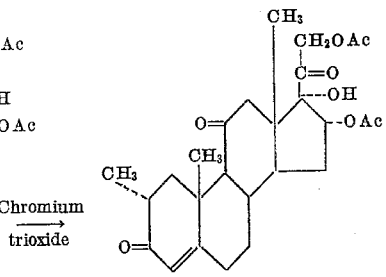

The starting material for the methods and products of this invention may be 21-acetoxy-20-ethylenedioxy-11β,16α,17α-trihydroxy-4-pregnene-3-one as described and claimed in copending application Serial No. 497,473, filed March 28, 1955. Other ketal groups, such as the propylene or butylene ketals, may be used in place of ethylene ketal as protective groups. Also, other acylating agents, such as propionic or butyric anhydrides, may be used instead of acetic anhydride to block the hydroxylated positions.

The following examples describe in detail the preparation of the compounds of this invention:

EXAMPLE 1

*Sodium enolate of 20-ethylenedioxy-11β,16α,17α,21-tetrahydroxy-2-ethoxyoxalyl-4-pregnene-3-one*

To 8.0 g. of 21-acetoxy-20-ethylenedioxy-11β,16α,17α-trihydroxy-4-pregnene-3-one suspended in 100 ml. of t-butanol was added 3.2 g. of commercial (95%) sodium methylate. To this mixture under nitrogen was added 5 ml. of diethyl oxalate, and the mixture was stirred under nitrogen for 6 hours. (Complete solution occurred, and the product precipitated within ten minutes.) Addition of ether, followed by filtration, gave 13 g. of yellow powder, soluble in water, but insoluble in dilute acid.

EXAMPLE 2

*20 - ethylenedioxy - 11β,16α,17α,21 - tetrahydroxy - 2 - ethoxyoxalyl-2-methyl-4-pregnene-3-one*

A mixture of 13 g. of crude sodium enolate of 20-ethylenedioxyl - 11β,16α,17α,21 - tetrahydroxy - 2 - ethoxyoxalyl-4-pregnene-3-one, 13 g. of potassium carbonate, 300 ml. of acetone, and 50 ml. of methyl iodide was refluxed 20 hours, filtered while hot, and the solvent evaporated to a small volume under reduced pressure. Extraction with ethyl acetate, washing with saline, treatment with magnesium sulfate and an activated animal charcoal, followed by filtration and evaporation to dryness under reduced pressure, gave 7.8 g. of pale yellow product, which could not be induced to crystallize.

EXAMPLE 3

*20-ethylenedioxy-11β,16α,17α,21-tetrahydroxy-2-methyl-4-pregnene-3-one*

To 7.8 g. of 20-ethylenedioxy-11β,16α,17α,21-tetrahydroxy - 2 - ethoxyoxalyl - 2 - methyl - 4 - pregnene - 3-one (from Example 2) in 250 ml. of absolute methanol was added 1.0 g. of sodium methylate (95% purity), and the mixture was allowed to stand at room temperature for 4 hours. After the addition of a few drops of acetic acid and 20 ml. of water, the methanol was removed under reduced pressure at a temperature not exceeding 35° C. Extraction with ethyl acetate, washing to neutral with saline, treatment with magnesium sulfate and an activated animal charcoal, filtration, and evaporation to dryness under reduced pressure gave 5.7 g. of yellow product, which could not be induced to crystallize.

EXAMPLE 4

*11β,16α,17α,21-tetrahydroxy-2α-methyl-4-pregnene-3,20-dione*

A mixture of 5.7 g. of 20 - ethylenedioxy - 11β,16α,17α,-21 - tetrahydroxy - 2α-methyl-4-pregnene - 3 - one (from Example 3), 200 ml. of methanol, and 12 ml. of 8% (v./v.) sulfuric acid was refluxed for one hour, concentrated under reduced pressure, extracted with ethyl acetate, and washed with sodium bicarbonate, saline, and water. Treatment with magnesium sulfate and an activated animal charcoal, filtration, and evaporation under reduced pressure gave 4.1 g. of yellow product.

This product was subjected to partition chromatography as follows:

Solvent system—3 ethyl acetate, 2 petroleum ether (boiling point 90–100° C.), 3 methanol, 2 water.

Column 68 cm. length, 5.2 cm. width, hold back volume 780 ml., cuts 20 ml. per 10 minutes. Total 250 cuts.

Cuts 100–200 were combined and evaporated to give 1.4 g. of product. One crystallization from acetone-petroleum ether (60–70° C.) gave 700 mg., melting point 193–196° C. A 200 mg. portion was recrystallized twice from acetone-petroleum ether to give 23 mg., melting point 201–203° C. Ultraviolet spectrum:

$$\lambda^{Abs.\ alcohol}_{Max.}\ 240\text{--}241\ m\mu\ (\epsilon 16{,}600)$$

The column was washed with methanol and gave 1.17 g. of an oil. Two recrystallizations from acetone gave 70 mg. of crystals which were identical with 11β,16α,17α,21-tetrahydroxy-4-pregnene-3,20-dione by admixture melting point and infrared spectral analysis.

EXAMPLE 5

*16α,21-diacetoxy-11β,17α-dihydroxy-2α-methyl-4-pregnene-3,20-dione*

A mixture of 11β,16α,17α,21-tetrahydroxy-2α-methyl-4-pregnene-3,20-dione (from Example 4) (130 mg.), 3 ml. pyridine, and 0.5 ml. acetic anhydride was heated at about 110° C., for 1 hour. Methanol was added and the solvents removed under reduced pressure to a small volume. The residue was washed with cold dilute sulfuric acid, dilute sodium bicarbonate, then with water to neutrality, treated with magnesium sulfate and an activated animal charcoal, filtered and evaporated to dryness under reduced pressure. The resulting oil was caused to crystallize by the addition of acetone and petroleum ether to give 70 mg., melting point 252–254° C. Two crystallizations from the same solvent pair gave 25 mg., melting point 253–254° C. Ultraviolet spectrum:

$$\lambda^{Abs.\ alcohol}_{Max.}\ 240\text{--}241\ m\mu\ (\epsilon 17{,}500)\ [\alpha]_D^{25}+91.8°\ (\text{chloroform})$$

Analysis.—Calcd. for $C_{26}H_{36}O_8$ (476.55): C, 65.53; H, 7.61. Found C, 65.43; H, 7.75.

EXAMPLE 6

*16α,21-diacetoxy-17α-hydroxy-2α-methyl-4-pregene-3,11,-20-trione*

To a previously prepared and cooled mixture of 180 mg. chromium trioxide in 3 ml. pyridine was added a cooled solution of 16α,21-diacetoxy-11β,17α-dihydroxy- 2α-methyl-4-pregnene-3,20-dione, and the solution was allowed to stand at 20° C. for 18 hours. Methanol was added and the solvents removed under reduced pressure at about 30° C. The residue was extracted with ethyl acetate, washed with cold dilute sulfuric acid, cold dilute sodium bicarbonate, then water to neutral. The extract was treated with magnesium sulfate and an activated animal charcoal, filtered and evaporated to dryness under reduced pressure to give a white powder. Three crystallizations from acetone-petroleum ether gave 77 mg., melting point 240.5–241.5° C. Ultraviolet spectrum:

$$\lambda_{Max.}^{Abs. alcohol}\ 237\ m\mu\ (\epsilon 15{,}200)$$

Analysis.—Calcd. for $C_{26}H_{34}O_8$ (474.55): C, 65.80; H, 7.22. Found: C, 65.49; H, 7.30.

We claim:

1. A compound of the group having the general formula

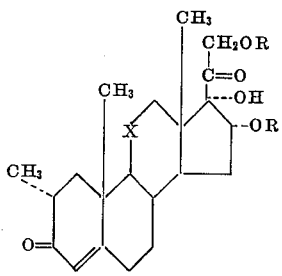

in which R is a member of the group consisting of hydrogen and lower alkanoyl radicals and X is a divalent radical of the group consisting of

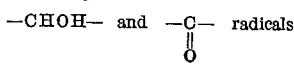

2. The compound 11β,16α,17α,21-tetrahydroxy-2α-methyl-4-pregene-3,20-dione.

3. The compound 16α,21-diacetoxy-11β,17α-dihydroxy-2α-methyl-4-pregnene-3,20-dione.

4. The compound 16α,21-diacetoxy-17α-hydroxy-2α-methyl-4-pregnene-3,11,20-trione.

5. A method of preparing compounds having the general formula

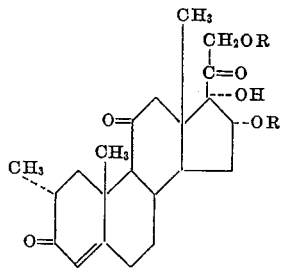

in which R is a lower alkanoyl radical, which comprises reacting a 21-lower alkanoyloxy-20-ethylenedioxy-11β,16α,17α-trihydroxy-4-pregnene-3-one with diethyl oxalate in the presence of an alkali metal alkoxide in a solvent to form an alkali metal enolate of 2-ethoxyoxalyl-20-ethylenedioxy-11β,16α,17α,21-tetrahydroxy-4-pregnene-3-one, treating said product with methyl iodide under alkaline conditions to form 2-ethoxyoxalyl-20-ethylenedioxy-11β,16α,17α,21-tetrahydroxy-2-methyl-4-pregnene-3-one, removing the 2-ethoxyoxalyl radical therefrom under alkaline conditions to form 20-ethylenedioxy-11β,16α,17α,21-tetrahydroxy-2α-methyl-4-pregnene-3-one, subjecting 20-ethylenedioxy-11β,16α,17α,21-tetrahydroxy-2α-methyl-4-pregnene-3-one to acid hydrolysis to form 11β,16α,17α,21-tetrahydroxy-2α-methyl-4-pregene-3,20-dione, acylating the product so formed to yield a 16α,21-di lower alkanoyloxy-11β,17α-dihydroxy-2α-methyl-4-pregnene-3,20-dione, and subsequently oxidizing said 16α,21-di lower alkanoyloxy-11β,17α-dihydroxy-2α-methyl-4-pregnene-3,20-dione to the corresponding 3,11,20-trione.

6. A method of preparing compounds having the general formula

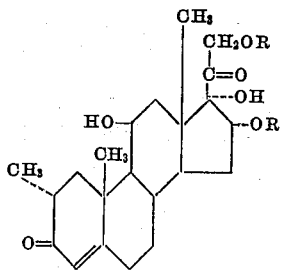

in which R is a lower alkanoyl radical, which comprises reacting a 21-lower alkanoyloxy-20-ethylenedioxy-11β,16α,17α-trihydroxy-4-pregnene-3-one with diethyl oxalate in the presence of an alkali metal alkoxide in a solvent to form an alkali metal enolate of 2-ethoxy-oxalyl-20-ethylenedioxy-11β,16α,17α,21-tetrahydroxy-4-pregnene-3-one, treating said product with methyl iodide under alkaline conditions to form 2-ethoxyoxalyl-20-ethylenedioxy-11β,16α,17α,21-tetrahydroxy-2-methyl-4-pregnene-3-one, removing the 2-ethoxyoxalyl radical therefrom under alkaline conditions to form 20-ethylenedioxy-11β,16α,17α,21-tetrahydroxy-2α-methyl-4-pregnene-3-one, subjecting 20-ethylenedioxy-11β,16α,17α,21-tetrahydroxy-2α-methyl-4-pregnene-3-one to acid hydrolysis to form 11β,16α,17α,21-tetrahydroxy-2α-methyl-4-pregnene-3,20-dione, and subsequently acylating the product so formed to yield a 16α,21-dilower alkanoyloxy-11β,17α-dihydroxy-2α-methyl-4-pregnene-3,20-dione.

7. A method of preparing 11β,16α,17α,21-tetrahydroxy-2-methyl-4-pregnene-3,20-dione which comprises reacting a 21-lower alkanolyoxy-20-ethylenedioxy-11β,16α,17α-trihydroxy-4-pregnene-3-one with diethyl oxalate in the presence of an alkali metal alkoxide in a solvent to form an alkali metal enolate of 2-ethoxyoxalyl-20-ethylenedioxy-11β,16α,17α,21-tetrahydroxy-4-pregnene-3-one, treating said product with methyl iodide under alkaline conditions to form 2-ethoxyoxalyl-20-ethylenedioxy-11β,16α,17α,21-tetrahydroxy-2-methyl-4-pregnene-3-one, removing the 2-ethoxyoxalyl radical therefrom under alkaline conditions to form 20-ethylenedioxy-11β,16α,17α,21-tetrahydroxy-2α-methyl-4-pregnene-3-one, and subsequently subjecting 20-ethylenedioxy-11β,16α,17α,21-tetrahydroxy-2α-methyl-4-pregnene-3-one to acid hydrolysis.

8. A method of preparing alkali metal enolates of 2-ethoxyoxalyl-20-ethylenedioxy-11β,16α,17α-trihydroxy-4-pregnene-3-ones, which comprises reacting a 21-lower alkanoyloxy-20-ethylenedioxy-11β,16α,17α-trihydroxy-4-pregnene-3-one with diethyl oxalate in the presence of an alkali metal alkoxide in a solvent.

9. A method of preparing 2-ethoxyoxalyl-20-ethylenedioxy-11β,16α,17α,21-tetrahydroxy-2-methyl-4-pregnene-3-one, which comprises treating an alkali metal enolate of 2-ethoxyoxalyl-20-ethylenedioxy-11β,16α,17α,21-tetrahydroxy-4-pregnene-3-one with methyl iodide under alkaline conditions.

10. A method of preparing 20-ethylenedioxy-11β,16α,17α,21-tetrahydroxy-2α-methyl-4-pregnene-3-one, which comprises removing the 2-ethoxyoxalyl radical from 2-ethoxyoxalyl-20-ethylenedioxy-11β,16α,17α,21-tetrahydroxy-2-methyl-4-pregnene-3-one under alkaline conditions.

11. A method of preparing 11β,16α,17α,21-tetrahydroxy-2α-methyl-4-pregnene-3,20-dione, which comprises subjecting 20-ethylenedioxy-11β,16α,17α,21-tetrahydroxy-2α-methyl-4-pregnene-3-one to acid hydrolysis.

12. A method of preparing a 16α,21-di lower alkanoyl-oxy-11β,17α-dihydroxy-2α-methyl-4-pregnene-3,20-dione, which comprises acylating 11β,16α,17α,21-tetrahydroxy-2α-methyl-4-pregnene-3,20-dione.

13. A method of preparing a 16α,21-di-lower alkanoyloxy-17α-hydroxy-2α-methyl-4 - pregnene - 3,11,20 - trione, which comprises oxidizing a 16α,21-di lower alkanoyloxy-11β,17α-dihydroxy-2α-methyl-4-pregnene-3,20-dione.

14. The method of claim 6 to prepare 16α,21-diacetoxy-11β,17α-dihydroxy-2α-methyl-4-pregnene-3,20-dione.

15. The method of claim 12 to prepare 16α,21-diacetoxy-11β,17α-dihydroxy-2α-methyl-4-pregnene-3,20-dione.

16. The method of claim 5 to prepare 16α,21-diacetoxy-17α-hydroxy-2α-methyl-4- pregnene - 3,11,20 - trione.

17. The method of claim 13 to prepare 16α,21-diacetoxy-17α-hydroxy-2α-methyl-4- pregnene - 3,11,20 - trione.

No references cited.